United States Patent [19]
de Groot

[11] Patent Number: 5,953,125
[45] Date of Patent: Sep. 14, 1999

[54] OPTICAL GAP MEASURING APPARATUS AND METHOD

[75] Inventor: Peter de Groot, Middletown, Conn.

[73] Assignee: Zygo Corporation, Middlefield, Conn.

[21] Appl. No.: 09/036,095

[22] Filed: Mar. 6, 1998

Related U.S. Application Data

[63] Continuation-in-part of application No. 08/784,603, Jan. 21, 1997, Pat. No. 5,751,427, which is a continuation of application No. 08/522,570, Sep. 1, 1995, Pat. No. 5,577,399.

[51] Int. Cl.$^6$ ........................................ G01B 9/02
[52] U.S. Cl. ........................... 356/357; 356/351; 356/358
[58] Field of Search ................................... 356/351, 357, 356/358

[56] References Cited

U.S. PATENT DOCUMENTS

| | | |
|---|---|---|
| 3,855,625 | 12/1974 | Garnier et al. . |
| 4,593,368 | 6/1986 | Fridge et al. . |
| 4,606,638 | 8/1986 | Sommargren . |
| 4,762,414 | 8/1988 | Grego . |
| 5,170,049 | 12/1992 | De Jonge et al. . |
| 5,218,424 | 6/1993 | Sommargren . |
| 5,280,340 | 1/1994 | Lacey . |

FOREIGN PATENT DOCUMENTS

| | | |
|---|---|---|
| 0 075 689 | 4/1983 | European Pat. Off. . |

OTHER PUBLICATIONS

L–Y. Zhu et al., "Measurement of Head/Disk Spacing With a Laser Interferometer," *IEEE Transactions On Magnetics*, vol. 24, No. 6, pp. 2739–2741 (Nov. 1988).

W. Stone, "A Proposed Method for Solving Some Problems in Lubrication," *The Commonwealth Engineer*, pp. 115–122 (Nov. 1, 1921).

M. V. Mantravadi, "Chapter 1—Newton, Fizeau, and Haidinger Interferometers,"*Optical Shop Testing, Second Edition*, pp. 1–48, John Wiley & Sons, Inc. (1992).

A. Nigam, "A Visible Laser Interferometer for Air Bearing Separation Measurement to Submicron Accuracy," *Transactions of the ASME*, vol. 104, pp. 60–65 (Jan. 1982).

T. Ohkubo et al., "Accurate Measurement of Gas–Lubricated Slider Bearing Separation Using Visible Laser Interferometry," *Transactions of the ASME*, vol. 110, pp. 148–155 (Jan. 1988).

G. L. Best et al., "Precise Optical Measurement of Slider Dynamics," *IEEE Transactions on Magnetics*, vol. MAG–22, No. 5, pp. 1017–1018 (Sep. 1986).

(List continued on next page.)

*Primary Examiner*—Robert H. Kim
*Assistant Examiner*—Amanda Merlino
*Attorney, Agent, or Firm*—Francis J. Caufield

[57] ABSTRACT

Polarization interferometric method and apparatus for high-speed measurement of the distance between two surfaces, the first of which is part of a substantially transparent element and the second of which is part of a test object. In a first step, a lens (2) directs a light beam (3) through a polarizing component (4) towards the first surface at an oblique angle of incidence. The measurement beam may be positioned on the surface under test (35, 35a) with an in-line optical system or a normal incidence one. In a next step, the polarized light beam (5) reflects back through the transparent element by means of the combined effect of reflections from the first surface of the transparent element and from the surface of the test object (30). In a further step, a polarization-sensitive intensity detector (12) and a phase detector (13) measure the strength and relative phase of the polarization components defined by the plane of incidence. A computer (99) then analyzes these measured parameters to determine the size of the gap between the two surfaces (25,35). An additional method and means are provided to measure the complex index of refraction of the object surface (35) by changing the gap between the surfaces (25,35) and making certain assumptions about the relationship between the reflectivities of the object and transparent element air boundaries.

36 Claims, 10 Drawing Sheets

OTHER PUBLICATIONS

B. Bhushan, "Tribology and Mechanics of Magnetic Storage Devices," Springer–Verlag, pp. 765–797, Date Not Available.

C. Lin et al., "Real time interferometric ellipsometry with optical heterodyne and phase lock–in techniques," *Applied Optics*, vol. 29, No. 34, pp. 5159–5162 (Dec. 1990).

H. F. Hazebroek et al., "Interferometric ellipsometry," *Journal of Physics E: Scientific Instruments*, pp. 822–826, vol. 6 (1973).

T. Smith, "An Automated Scanning Ellipsometer," *Surface Science*, pp. 212–220, vol. 56 (1976).

R. F. Spanier, "Ellipsometry—A Century Old New Technique," Reprinted from *Industrial Research*, (Sep. 1975), Page Nos. Not Available.

D. P. Pilipko et al., "Interference Ellipsometer," *8164 Instruments and Experimental Techniques*, pp. 951–952, vol. 26, No. 4, Part 2 ( Jul.–Aug. 183).

C. Lacey et al., "Interferometric Measurement of Disk/Slider Spacing: The Effect of Phase Shift on Reflection," *IEEE Transactions on Magnetics*, vol. 29, No. 6, pp. 3906–3908 (Nov. 1993).

L. Singher et al., "Ellipsometry with a Stabilized Zeeman Laser," *Applied Optics*, vol. 29, No. 16, pp. 2405–2408 (Jun. 1990).

J. M. Fleischer al., "Infrared Laser Interferometer for Measuring Air–Bearing Separation," *IBM J. Res. Develop.*, pp. 529–533 (Nov. 1974).

IDEMA Sub 2–Microinch Fly Height Workshop Proceedings, pp. 31–108, date not available.

R. Pavlat, "Flying Height Measurement Systems and Slider Absorption(k)," and other articles published in *IDEMA Insight*, vol. VII, No. 5 (Sep./Oct. 1994).

Y. Sato et al., "The Koyo FM2000 Fly Height Tester," *IDEMA Sub 2–Microinch Fly Height Workshop Proceedings*, pp. 31–44, Date Not Available.

D. H. Veillard, "New Possibilities in Head–Disk Separation Movement,"*IDEMA Sub 2–Microinch Fly Height Workshop Proceedings*, pp. 47–55, Date Not Available.

C. Lacey, "A New Method for Measuring Flying Height Dynamically, "*IDEMA Sub 2–Microinch Fly Height Workshop Proceedings*, pp. 59–74, 1992.

T. McMillan, "Ultra Low Flying Height Measurements Using Laser Interferometry and Fringe Intensity Determination," *IDEMA Sub 2–Microinch Fly Height Workshop Proceedings*, pp. 93–108, May 1993.

G. L. Best, "Comparison Of Optical And Captive Measurements Of Slider Dynamics," *IEEE Transactions on Magnetics*, vol. MAG–23, No. 5, pp. 3453–3455 (Sep. 1987).

OPTICAL GAP MEASURING APPARATUS AND METHOD

CROSS-REFERENCE TO RELATED APPLICATION

This application is a continuation-in-part of my U.S. patent application Ser. No. 08/784,603 filed on Jan. 21, 1997, now U.S. Pat. No. 5,751,427, and entitled OPTICAL GAP MEASURING APPARATUS AND METHOD which, in turn, is a continuation of U.S. patent application Ser. No. 08/522,570 filed on Sep. 1, 1995 and entitled "OPTICAL GAP MEASURING APPARATUS AND METHOD", now U.S. Pat. No. 5,577,399 issued on Sep. 17, 1996, all of which are commonly owned herewith.

FIELD OF THE INVENTION

The present invention relates to high-speed, high precision measurement of the distance between two surfaces, one of which is on a substantially transparent element. In particular, the invention relates to an apparatus and method for performing this measurement using polarized light and interferometry.

BACKGROUND OF THE INVENTION

A critical parameter in rigid disk drive design is the height or gap between the read-write slider and the magnetic medium. The flying height is below 50 nm at the present state of the art, but because the height is not easily measured directly, the exact value is difficult to determine in an assembled drive. For this reason, the Data Storage Industry relies on optical testers for quantifying flying height in production and in developing new designs as explained in, for example, B. Bhushan, *Tribology and Mechanics of Magnetic Storage Devices* (New York: Springer-Verlag, 1990) pp. 765–797.

Optical testers employ a rotating, transparent glass substrate or surrogate disk in place of the magnetic disk and determine the flying height by analysis of interference phenomena between the slider and the glass as described in, for example, W. Stone, "A proposed method for solving some problems in lubrication" The Commonwealth Engineer, (Nov. 1921 and Dec. 1921); J. M. Fleischer and C. Lin, "Infrared laser interferometer for measuring air-bearing separation," IBM J. Res. Develop. 18 (6), 529–533 (1974); T. Ohkubo and J. Kishegami, "Accurate Measurement of Gas-Lubricated Slider Bearing Separation using Laser Interferometry," Trans. ASME, Vol 110, pp 148–155 (Jan. 1988); C. Lacey, J. A. Adams, E. W. Ross, and A. Cormier, "A new method for measuring flying height dynamically," Proc. DiskCon '92 (1992), pp.27–42; and T. E. Erickson and J. P. Lauer, "Multiplexed laser interferometer for non-dispersed spectrum detection in a dynamic flying height tester," U.S. Pat. No. 5,673,110 (Sep. 30, 1997).

However, the exact flying height of a slider in an optical tester is often not known to an adequate degree of precision due in part to variations in the optical properties of the slider material, including most specifically, the real and imaginary parts of the effective complex index of refraction. These quantities, commonly known as the optical constants n and k, play an important role in calculating the absolute flying height. Traditionally, an ellipsometer measures the optical constants of a material, and the results are entered by hand into the flying-height test software. In practice, the ellipsometric geometry is very different from that of typical flying-height testers, so a completely separate instrument is used for this purpose.

The independent measurement of optical constants is a significant burden in optical flying-height testing. Furthermore, uncertainty in the values of n and k related to infrequent or incorrect ellipsometric analysis introduces systematic errors of several nm. These errors are often invisible to instrument qualification screens such as system to system correlation, repeatability and reproducibility. Thus, it is possible to have self-consistent flying height data that is also consistently inaccurate.

Ideally, a flying-height tester incorporates means to determine the optical constants in situ, for every slider under test. To achieve this ideal, a flying-height test geometry is proposed herein involving an oblique angle of incidence and a high-speed homodyne interferometric receiver. As will be seen, ellipsometry and radiometry are applied directly to the flying height problem by treating the air gap as a dynamic thin film (See, e.g., P. de Groot, L. Deck, J. Soobitsky, J. Biegen, "Polarization interferometer for measuring the flying height of magnetic read-write heads," Opt. Lett. 21 (6), 441–443 (1996); P. de Groot, J. Biegen, L. Deck, A. Dergevorkian, T. Erickson, J. Morace, R. Pavlat and J. Soobitsky, "Polarization interferometer for flying height testing," Proc. IDEMA Future Dimensions in Storage Symposium, 89–94 (1997); and P. de Groot, "Optical gap measuring apparatus and method" U.S. Pat. No. 5,557,399 (1996)).

This technique is referred to as polarization interferometry to distinguish it from the classical null ellipsometer with its rotating waveplates and polarizers. A significant benefit of polarization interferometry is that there is sufficient information to solve for n and k as part of the flying height test procedure. The present invention describes how n and k are calculated and also provides an estimate of uncertainty and its effects on the final flying height.

As mentioned above, the optical constants of sliders play an important role in the precise determination of flying height. Muranushi, Tanaka and Takeuchi were the first to describe in detail the importance of including the optical properties of slider materials in optical flying height testing (F. Muranushi, K. Tanaka, and Y. Takeuchi, "Estimation of zero-spacing error due to a phase shift of reflected light in measuring a magnetic head slider's flying height by light interference" Adv. Info. Storage syst., 4, 1992, p.371). The same paper was presented at the ASME Winter Annual Meeting, Atlanta, Ga. (1991).

The fundamental issue is the phase shift that occurs at the slider air-bearing surface (ABS) upon reflection. In a conventional flying height tester, there is no way to distinguish between a phase shift on reflection and the actual gap between the slider and the ABS. Muranushi et al. refer to this problem as zero spacing error or ZSE. As is shown in Table 1 below, the ZSE can be as large as 20 nm, which is the same magnitude as the flying height of modern high-performance sliders (The calculations for Table 1 also appear in the paper "Interferometric measurement of disk/slider spacing: The effect of phase shift on reflection," by C. Lacey, R. Shelor, A. Cormier and R. E. Talke, IEEE Trans. Magn. *MAG-29* (6) (1993)).

TABLE 1

Theoretical zero-spacing error Δh
attributable to the material phase change on
reflection of Al₂O₃—TiC at three different wavelengths.

| λ (nm) | n | k | Δh (nm) |
|---|---|---|---|
| 405 | 2.15 | 0.55 | 8.8 |
| 633 | 2.14 | 0.47 | 12.1 |
| 830 | 2.13 | 0.61 | 20.1 |

It is therefore critical to characterize and correct for the optical properties of the ABS, which vary with material composition and structure.

The most common material for the body and ABS of read-write sliders is an amalgam of alumina ($Al_2O_3$) and titanium carbide (TIC). Under an optical microscope, the polished ABS shows grains of brightly-reflecting TiC imbedded in alumina. The grains are typically a few microns in width, and a scanning-probe microscope reveals that the TiC is raised several nm above the alumina. A light beam incident on such a surface diffracts into a broad range of angles, with a resultant amplitude and phase that depends strongly on the size, distribution and relative surface height of the TiC. The apparent reflectivity of such a surface depends therefore on the surface structure, angle of incidence and numerical aperture of the imaging optics.

Given the material complexity of the ABS surface, it is not easy to predict its optical properties. It has become common practice in flying-height testing to model the complicated physical structure of TiC as a smooth, homogeneous material, for which it is possible to calculate the reflected electric field using a single, complex index of refraction. This simplified model assumes that the effective n and k measured by an ellipsometer are sufficient to estimate the complex reflectivity of the ABS for any optical system, including any material-dependent phase shifts.

Assuming that it is meaningful to define an effective n and k of the slider ABS, the complex reflectivity for s and p polarized light follow from the Fresnel equations (M. Born and E. Wolf, "Principles of Optics" (Pergamon Press) p. 40):

$$r_s = \frac{\tan(\phi - \bar{\phi})}{\tan(\phi + \bar{\phi})} \quad (1.)$$

$$r_p = \frac{\sin(\phi - \bar{\phi})}{\sin(\phi + \bar{\phi})}$$

Here $\phi$ is the angle of incidence and $\bar{\phi}$ is the (complex) angle of refraction. The angles are related by Snell's law:

$$n \sin(\bar{\phi}) = \sin(\phi), \quad (2.)$$

where $$\tilde{n} = n + ik, \quad (3.)$$

is the effective complex refractive index of refraction, found by performing conventional ellipsometry (Following Born and Wolf, we prefer to use the n+ik definition of the complex index, rather than the more common n−ik). The Fresnel Eqs. (1) and (2) are the starting point for the theoretical estimates of ZSE presented in Table 1.

In reality, Eqs.(1) and (2) are only approximately true, because of the heterogeneous nature of the slider material. For example, it should be possible to calculate the intensity reflectivity at normal incidence using the formula:

$$R = \left| \frac{\tilde{n} - 1}{\tilde{n} + 1} \right|^2. \quad (4.)$$

This is an easy result to check experimentally, by simply measuring the incident and reflected intensities for a Helium Neon laser beam. Results of such an experiment using the same laser and small-aperture collection optics for both 50° ellipsometry and normal-incidence reflectance measurements are reported in Table 2 for several different types of $Al_2O_3$-TiC and show that the calculated R using the effective n and k are consistently wrong, by about 20%. This error indicates that the simple n and k model is not entirely satisfactory for heterogeneous materials such as $Al_2O_3$-TiC.

Although there are clear deficiencies in the n and k model, evidence suggests that this simplification is still useful and considerably better than ignoring material effects altogether. The theory calculations in Table 2 below have the wrong absolute magnitudes, but nonetheless properly rank the sample materials according to their relative reflectivities.

TABLE 2

Intensity reflectivity of four $Al_2O_3$—TiC
samples compared with the theoretical
predictions using n and k.

| Ellipsometry | | Reflectivity | |
|---|---|---|---|
| n | k | theory | measured |
| 2.16 | 0.40 | 0.148 | 0.122 |
| 2.22 | 0.43 | 0.157 | 0.127 |
| 2.19 | 0.56 | 0.165 | 0.132 |
| 2.37 | 0.54 | 0.185 | 0.144 |

There is also ample evidence to suggest that the ZSE is correlated to the effective optical constants. For these reasons, Muranushi et al. (supra) proposed ellipsometric analysis as a means of characterizing slider materials for optical flying height testing. Their approach has become accepted standard practice in the measurement procedures of commercial test equipment (e.g., R. Pavlat "Flying height measurement systems and slider absorption", IDEMA Insight 7 (5), p.1 (1994); Y. Li, "Flying height measurement on $Al_2O_3$ film of a magnetic slider," Proc. ASME/STLE Joint Tribology Conference. Paper 96-TRIB-61 (1996); and K. Lue, C. Lacey and F. E. Talke, "Measurement of flying height with carbon overcoated sliders," IEEE Trans. Magn. 30 (6), 4167–4169 (1994))

Whatever the limitations of the n and k model, once it is accepted as a useful and meaningful approximation, it seems sensible to combine the role of the ellipsometer with that of the flying height tester to reduce the measurement errors attributable to infrequent or incorrect ellipsometric analysis. Consequently, one of the objects of this invention has been to develop an optical sensing technology that measures the effective optical constants n and k of sliders during flying height testing. As will be shown, this is achieved by analysis of the polarization state of light reflected from the slider-glass interface.

Other objects of the invention will in part be obvious and in part appear hereinafter when the detailed description to follow is read in connection with the various figures.

SUMMARY OF THE INVENTION

This invention relates to apparatus and methods for analyzing a gap separating two surfaces through the use of polarization interferometry that takes into account the complex index of refraction effects of the boundaries between the surfaces. In accordance with one aspect of the invention, apparatus is provided comprising:

a transparent element having a reference surface;

mounting means for facilitating the relative positioning of an object surface with respect to said reference surface so that the size of the gap between said reference surface and said object surface varies in a characteristic way as a function of the relative position between the two;

means for selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transparent element at an oblique angle and reflected from said reference surface and said object surface as a combined return beam that emerges from said transparent element to travel along a predetermined measurement path disposed along a predetermined angle with respect to said oblique angle of incidence, said combined return beam containing p- and s-polarization components whose intensities and relative phase vary in accordance with the size of the gap between said reference surface and said object surface at the spot of measurement;

means for measuring said combined return beam to determine the intensities and relative phase of its p- and s-polarization components and generate data that relates the size of the gap with the values of the measured intensities and relative phase of said p- and s-polarization components; and means for determining the effective reflectivities between the object surface and air and the transparent element surfaces and air and the size of the gap between said reference and object surface for at least one predetermined object position and measurement spot on said object surface, where the reflectivities are given by:

$$z_{s,p}(\beta) = \frac{r_{s,p} + r''_{s,p}\exp(i\beta)}{1 + r_{s,p}r''_{s,p}\exp(i\beta)},$$

where $\beta$ is given by:

$$\beta = 2kh\ \cos(\phi),$$

and the subscripts refer to the s and p polarization states, h is the gap, $k=2\pi/\lambda$, $\phi$ is the angle of incidence, the reflectivities $r_{s,p}$ are for the glass-air boundary of said transparent element, while the reflectivities $r''_{s,p}$ refer to the air-object surface boundary. In the apparatus, the reflectivities are related by:

$$r''_{s,p} = (1-\mu)r'_{s,p}e^{i\delta},$$

where $r'_{s,p}$ is the reflectivity calculated from Fresnel's formulas and the parameter $\mu$ and $\delta$ are real constants.

In accordance with another aspect of the invention a method for analyzing a gap separating two surfaces is provided where the method comprises the steps of:

providing a transparent element having a reference surface;

facilitating the relative positioning of an object surface with respect to said reference surface so that the size of the gap between said reference surface and said object surface varies in a characteristic way as a function of the relative position between the two;

selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transparent element at an oblique angle and reflected from said reference surface and said object surface as a combined return beam that emerges from said transparent element to travel along a predetermined measurement path disposed along a predetermined angle with respect to said oblique angle of incidence, said combined return beam containing p- and s-polarization components whose intensities and relative phase vary in accordance with the size of the gap between said reference surface and said object surface at the spot of measurement;

measuring said combined return beam to determine the intensities and relative phase of its p- and s-polarization components and generate data that relates the size of the gap with the values of the measured intensities and relative phase of said p- and s-polarization components; and determining the effective reflectivities between the object surface and air and the transparent element surfaces and air and the size of the gap between said reference and object surfaces for at least one predetermined object position and measurement spot on said object surface, where the reflectivities are given by:

$$z_{s,p}(\beta) = \frac{r_{s,p} + r''_{s,p}\exp(i\beta)}{1 + r_{s,p}r''_{s,p}\exp(i\beta)},$$

where $\beta$ is given by:

$$\beta = 2kh\ \cos(\phi),$$

and the subscripts refer to the s and p polarization states, h is the gap, $k=2\pi/\lambda$, $\phi$ is the angle of incidence, the reflectivities $r_{s,p}$ are for the glass-air boundary of said transparent element, while the reflectivities $r''_{s,p}$ refer to the air-object surface boundary.

BRIEF DESCRIPTION OF THE DRAWINGS

The structure and operation of the invention, together with other objects and advantages thereof, may best be understood by reading the detailed description in connection with the drawings in which unique reference numerals have been used throughout for each part and wherein.

DETAILED DESCRIPTION OF THE INVENTION

Figure 1:
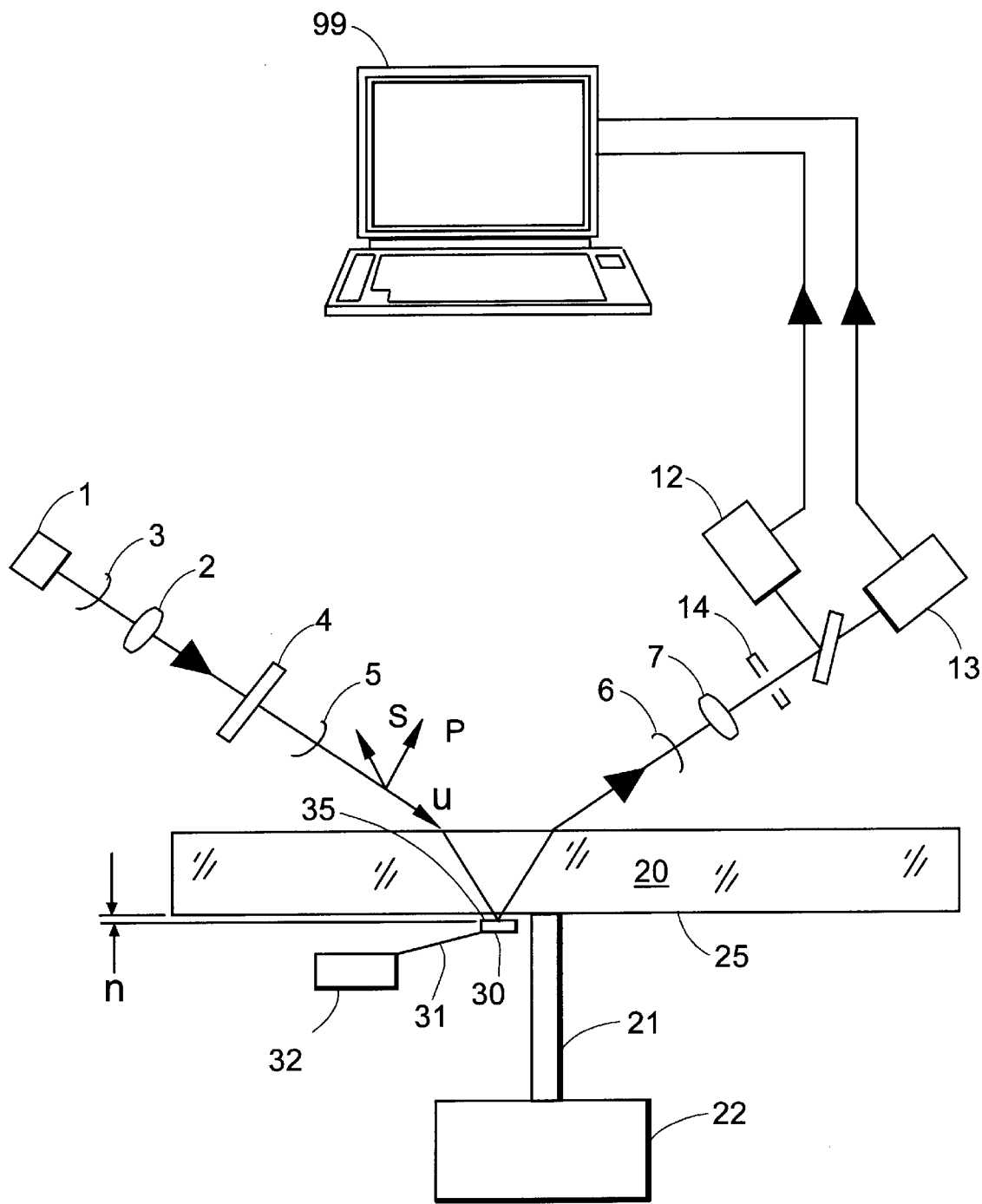
FIG. 1 is a diagrammatic view showing a preferred embodiment of the invention for measuring the distance of a flat object surface with respect to the surface of a rotating transparent disk.
Figure 2:
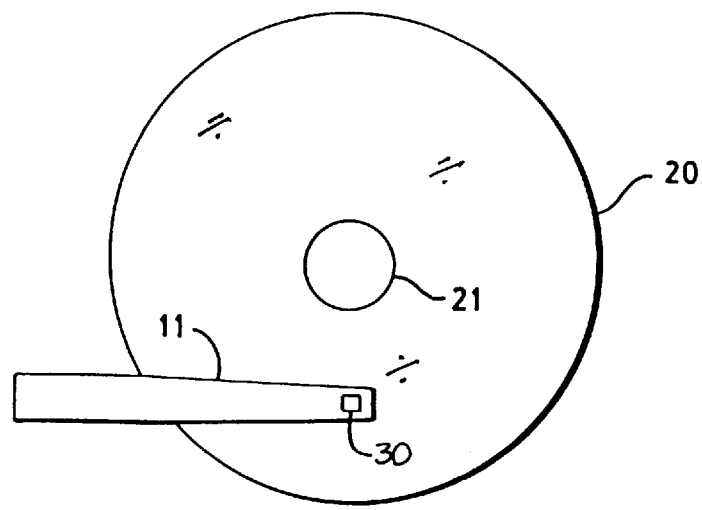
FIG. 2 is a diagrammatic top view of the disk of FIG. 1 indicating the positions of the object and of the various measurement points.

FIG. 1 shows a preferred embodiment of the invention employing an interferometer structured for measuring the distance of a surface 35 of an object 30 that is nearly in contact with a rotating transparent disk 20. The apparatus in this embodiment is preferably adapted to predict the aerodynamic flight characteristics of a conventional slider 30 or object over the surface of a rotating magnetic storage medium through the use of the transparent disk surrogate 20. The present invention preferably measures the gap between a surface 25 of rotating transparent disk 20 and a surface 35 of the test object or slider 30. Disk 20 is shown preferably attached to a spindle 21 driven by a motor 22 so the size of the gap which is to be measured varies as a function from the speed of rotation of disk 20. The position of test object 30 with respect to spindle 21 may be further clarified by reference to FIG. 2, which shows the disk 20 as viewed from the top, indicating the position of the test object 30.

Referring now to FIG. 1, the illumination for the measurement is preferably provided by source 1, which may be a light-emitting diode, a laser diode, a gas laser, a discharge lamp or like source of light. A lens 2 preferably directs the light beam 3 through a polarizing element 4, which may be, for example, a dichroic linear polarizer. Polarized light beam 5 preferably propagates towards the first surface of disk 20 at an oblique angle. The plane of incidence of the beam preferably defines a polarization basis vector p, to which is associated an orthogonal basis vector s. Preferably the polarization of light beam 5 is such so that both s- and p-type polarizations are present.

Light beam 5 is preferably reflected back through disk 20 emerging as a light beam 6, as shown in FIG. 1. Reflected light beam 6 is the result of combined reflections from surface 25 of disk 20 and from surface 35 of test object 30. The combined reflectivity of the two surfaces 25, 35 depends on the polarization state of beam 5, resulting in a change in the relative phases of the two polarizations, s and p, as well as a change in the amount (intensity) of light in each polarization. These changes are a function in part of the separation between surfaces 25 and 35. The apparatus of the present invention preferably further comprises a polarization-sensitive intensity meter 12 for measuring the amount of light in each polarization, as well as phase detector 13 for determining the difference in phase between the s and p polarizations. The preferred embodiment of the present invention also preferably includes a removable polarizing element 14, which may be a polarizer or a waveplate, for the purpose of calibrating and verifying the correct operation of intensity meter 12 and of phase detector 13, shown in greater detail in FIG. 3.

Figure 3:
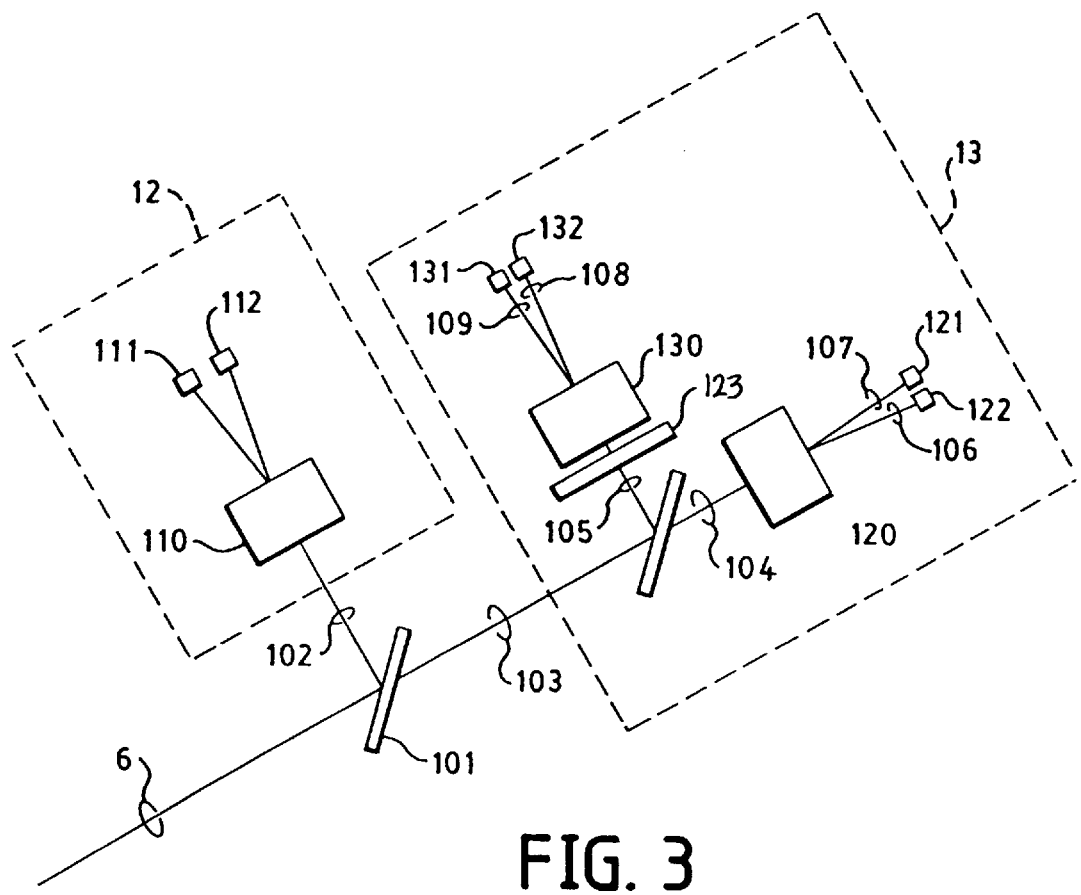
FIG. 3 is a diagrammatic view showing a preferred embodiment of the intensity and phase detector assemblies employed in the embodiment of FIG. 1.

As shown in FIG. 3, a beam splitter 101 divides reflected light beam 6 into two beams 102 and 103. The intensity meter 12, as depicted in FIG. 3, preferably includes a polarizing element 110, such as a Wollaston prism or a polarizing beam splitter, which separates the two s and p polarizations of beam 102 and directs them towards two photodetectors 111 and 112. The intensity measured by these photodetectors is preferably transmitted electronically to a conventional computer 99 (shown in FIG. 1).

Referring now to phase detector 13, illustrated in greater detail in FIG. 3, beam 103 is preferably further divided into two beams 104 and 105. A polarizing element 120, which may also be a Wollaston prism or the like, is oriented so as to mix the two s and p polarizations of beam 105 into two beams 106 and 107, orthogonally polarized with respect to each other. The mixing of the two polarizations by polarizing element 120 preferably results in an interference effect characteristic of the relative intensities of the two polarizations, the relative phase between the two polarizations, the exact orientation of polarizing element 120, as well as other factors of lesser interest. The intensity of beams 106 and 107 are preferably measured by two photodetectors 121 and 122, whose electrical signals are sent to a computer 99.

Beam 105 preferably passes through a waveplate 123, which may, for example, be a quarter-wave plate. The effect of waveplate 123 is to preferably shift the relative phase of the two s and p polarizations. A third polarizing element 130, which may also be a Wollaston prism or the like, is preferably oriented so as to mix the two polarizations, s and p, of beam 105 into two beams 108 and 109, orthogonally polarized with respect to each other. The mixing of the two polarizations by polarizing element 130 also preferably results in an interference effect characteristic of the relative intensities of the two polarizations. The intensity of beams 108 and 109 are preferably measured by two photodetectors 131 and 132, whose electrical signals are also sent to the computer 99.

It will be appreciated by those skilled in the art that detectors 111, 112, 121, 122, 131, and 132 may each be individual detectors, or linear array detectors, or two-dimensional array detectors.

Phase detector 13 preferably functions by mathematical analysis of the intensities $I_{1\ldots4}$ measured by photodetectors 121, 122, 131, and 132 shown in FIG. 3. The presently-preferred phase measurement method preferably requires that polarizing elements 120,130 and waveplate 123 be so selected and arranged so that the four intensities $I_{1\ldots4}$ correspond to a sequence of four interference signals separated in phase by exactly $\pi/2$ radians. It is then possible to extract the phase difference between the s and p polarizations by means of the formula $$\theta = \tan^{-1}\left(\frac{I_1 - I_3}{I_2 - I_4}\right)$$

This formula is frequently referred to in the art as the "four step algorithm" for phase estimation (see for example p. 511 of the book *Optical Shop Testing,* second edition, edited by Daniel Malacara (Wiley, N.Y., 1992)). Other known algorithms for phase estimation may also be used and are described in detail in the book *Optical Shop Testing.*

The intensities $I_{s,p}(\beta)$ and the phase $\theta(\beta)$ (see Eq. 9) together preferably provide sufficient information to determine the distance h between surfaces 25 and 35 unambiguously, over a range defined by the expression:

$0 \leq \beta < 2\pi$.

Those skilled in the art will appreciate that the data analysis presented herein assumes that the apparatus itself, comprised of a series of optical elements such as lenses, beam splitters and the like, does not significantly alter the polarization state of beams 5 and 6 shown in FIG. 1. If in practice such optical elements alter the polarization state of the measurement beams, the influence of such optical elements on the measurement parameters would necessarily need to be minimized or accounted for in the data processing. For example, if lens 7 in FIG. 1 were not perfectly free of stress birefringence, it would modify the polarization state of beam 6 and influence the measurement parameters $I_{s,p}(\beta)$ and $\theta(\beta)$. Thus, lens 7 should be selected and mounted for minimum stress birefringence.

An additional concern in the reduction to practice of the invention is the influence of stress birefringence in disk 20 shown in FIG. 1. Disk 20 may become birefringent because of residual stress of manufacture, the stress of clamping disk 20 to spindle 21, or because of the centripetal forces generated by rapid rotation. These effects should also be minimized or accounted for in the data processing. For example, disk 20 should preferably be clamped to spindle 21 using a minimum amount of force consistent with reliable and safe operation of the invention.

Those skilled in the art will also appreciate that alternative detection means may be used without departing from the spirit of the invention. For example, although the present detailed description of the Invention describes a particular form of phase detector comprising polarizing elements and multiple detectors, alternate forms of phase detector may be substituted. One alternative phase-estimation technique suitable for the method of the present invention is heterodyne interferometry, as described on pp. 70, 71, 73, 189 of the book "Basics of Interferometry" by P. Hariharan (Academic Press, Boston, 1992).

Figure 4:
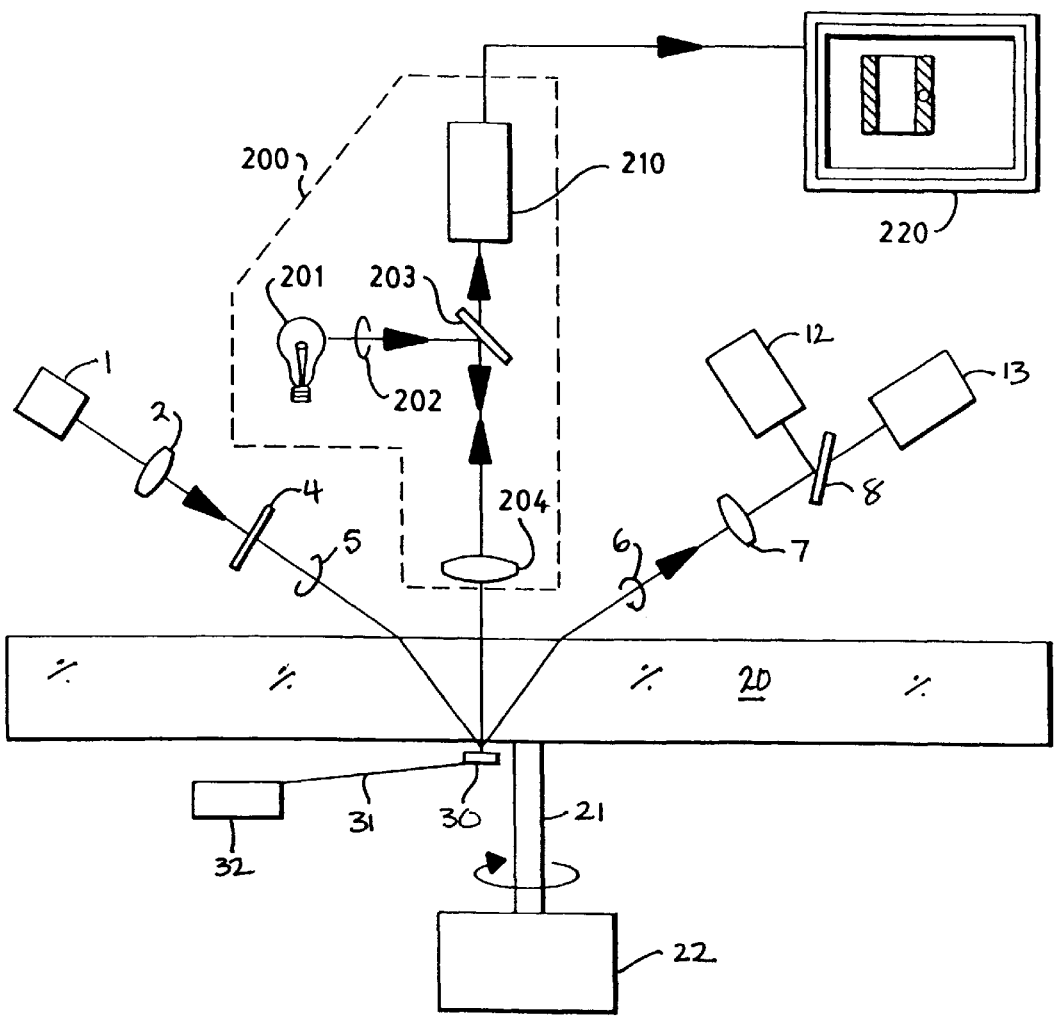
FIG. 4 is a diagrammatic view showing an alternative embodiment of the invention illustrating the placement of a viewing microscope used for the purpose of determining the measurement position on the surface under test.
Figure 5:
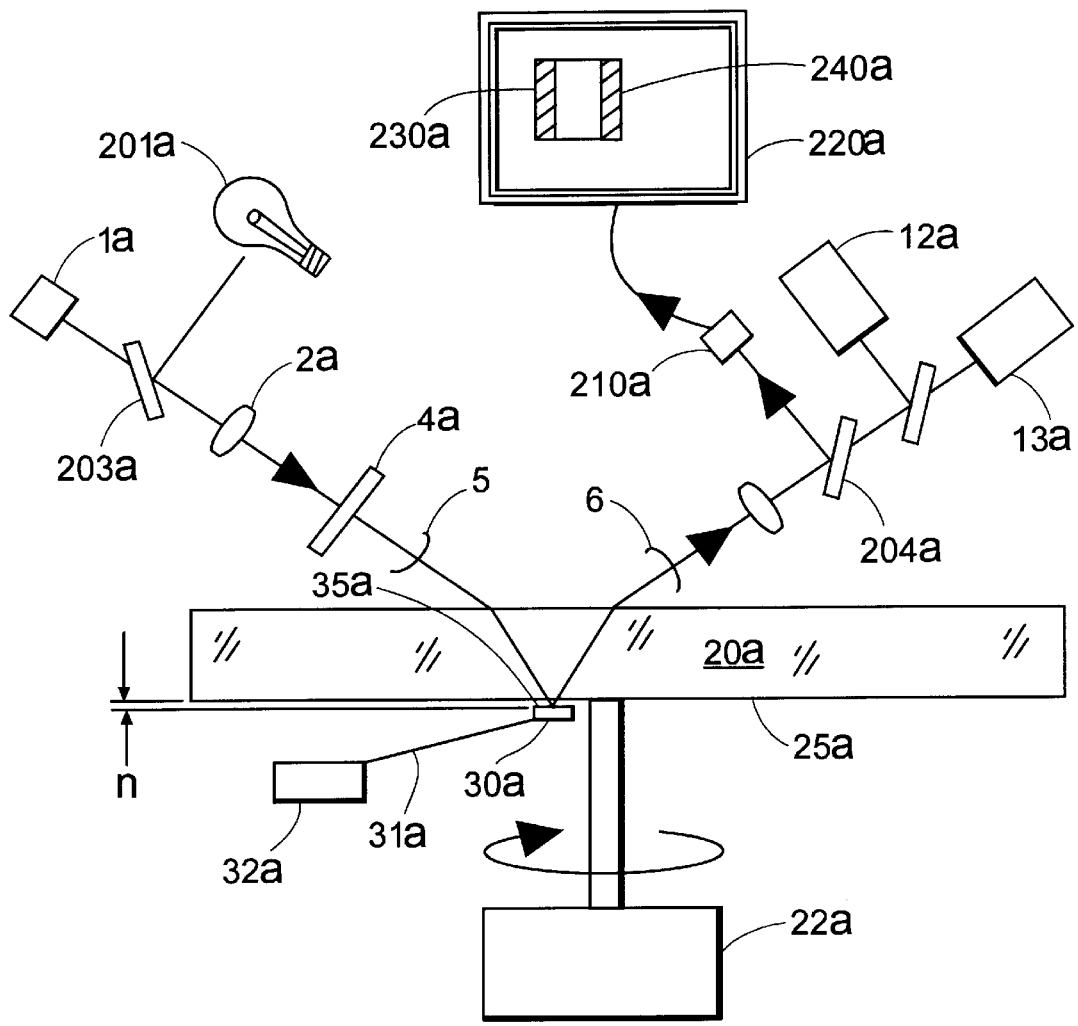
FIG. 5 is a diagrammatic elevational view showing another alternative embodiment of the invention illustrating the use of an in-line optical sytem to position the measurement beam on the surface under test with an in-line optical system.

FIG. 4 is a drawing depicting an alternative embodiment of the present invention in which a microscope 200 has been added for the purpose of observing the test object at normal incidence and determining the position of the measurement point on the surface under test, though the presently preferred approach, as illustrated in FIG. 5, is to position the measurement beam on the surface under test with an in-line optical system, as opposed to the normal incidence system illustrated in FIG. 4.

Referring now to FIG. 4, a beam splitter 203 in microscope 200 preferably directs a light beam 202 emitted by a source 201 through a lens 204. Beam 202 is preferably reflected back through lens 204 and impinges upon the sensitive area of a closed-circuit television camera 210. The electronic image generated by camera 210 may be viewed on a monitor 220 or sent to the computer 99 for further processing.

FIG. 5 is a drawing depicting a presently preferred alternative embodiment of the invention in which an in-line viewing system has been added for the purpose of observing the test object and determining the position of the measurement point on the surface under test. Referring now to FIG. 5 like components to those illustrated in FIG. 4 employ the same reference numeral followed by the letter "a", as shown and preferred in FIG. 5. A diffuse light source 201a, which may be an incandescent bulb, a light emitting diode or the like, is combined with the source beam by a beam-splitter element 203a. Light from source 201a illuminates surface 35a of test object 30a and is reflected back through disk 20a. A beam splitter 204a reflects a portion of the light originally emanating from source 201a onto a camera 210a. At the same time, beam splitter 204a also reflects a portion of the light originally emanating from source 1a. Electronic signals from camera 210a are displayed as an image 230a on a video monitor 220a. Because light from source 1a is focused onto surface 35a, image 230a shows a bright spot 240a corresponding to the measurement position on surface 35a. Conversely, light from diffuse source 201a illuminates a substantial area of surface 35a to provide a clear image of a substantial portion of surface 35a. Those skilled in the art will appreciate that additional image processing means may be employed to automatically locate the position of spot 240a with respect to physical features on surface 35a.

Those skilled in the art will also appreciate that alternative means and methods are possible for observing the test object and determining the position of the measurement point on the surface under test. In particular, the illumination and electronic imaging may comprise a substantially independent optical system such as a microscope, operating at either normal incidence or at an oblique angle, such as described with respect to FIG. 4. Such independent optical means may also include independent processing means for determining the point of measurement or for facilitating the loading of test object 30a, and the independent processing means may also include complementary analysis of a gap between surface 35a and surface 25a to verify the gap measurement or increase its range. For example, the independent optical means may comprise a microscope employing a light source that results in interference colors according to known prior art techniques, such as referred to above.

Having now described embodiments of apparatus in accordance with the present invention, a description of the polarization interferometry methodology will now be provided. It will be understood by those skilled in the art that the alogrithms that follow may be implemented in software to run on computer 99 under appropriate operating systems such as Microsoft Corporation's Windows or NT.

Referring again to FIG. 1, polarized beam 5 preferably illuminates test object 30 through disk 20 at an incident angle $\phi \neq 0$. Preferably beam 5 may be decomposed into two orthogonal polarization components p and s, where p refers to the component parallel to the plane of incidence. The incident electric field vector for beam 5 may therefore be represented by the expression:

$$E = \begin{pmatrix} E_s \\ E_p \end{pmatrix}. \tag{5.}$$

For example, if the incident beam is linearly polarized with equal s and p components, then $E_s = E_p = 1/\sqrt{2}$. The electric field components $E_{s,p}$ are complex numbers, so that any relative phase shift between the polarization components may be represented as a complex phase angle.

The combined reflections from the slider surface 35 and the surface of the glass disk 20 modify the polarization state of the beam. The electric field for the reflected beam is:

$$E' = SE \tag{6.}$$

where, $$S = \begin{pmatrix} z_s & 0 \\ 0 & z_p \end{pmatrix} \tag{7.}$$

and $z_{s,p}$ are the effective reflectivities of the slider-glass combination. The effective reflectivities are given by:

$$z_p(\beta) = \frac{r_p + r'_p \exp(i\beta)}{1 + r_p r'_p \exp(i\beta)}, \tag{8.}$$

where $\beta$ is given by:

$$\beta = 2kh \cos(\phi), \tag{9.}$$

and the subscripts refer to the s and p polarization states. The reflectivities $r_{s,p}$ are for the glass-air boundary, while the reflectivities $r''_{s,p}$ refer to the air-slider boundary. Constant, real parameters $\mu$ and $\delta$ account for the difference between the n and k model and the reflective properties of typical slider materials such that:

$$r''_{s,p} = (1-\mu)r'_{s,p}e^{i\delta}, \tag{10.}$$

where $r'_{s,p}$ is the reflectivity calculated from the Fresnel formulas (Eqs.1 and 2). The $\mu$ parameter is set to 0.05, which is a compromise between the measured value for heterogeneous $Al_2O_3$-TiC and theoretical value for true homogeneous materials and the parameter $\delta$ is zero for homogeneous materials and otherwise is nonzero for nonhomogeneous materials, depending on material properties, the geometry of the measurement system, and the adopted definition of flying height.

The S matrix in Eq.(7) is a function of flying height, h. Therefore, the polarization state of the reflected electric field E' is also related to flying height,h. The homodyne interferometric receiver arrangement of FIG. 1 measures an intensity I and a phase $\theta$ and defined by:

$$I = |E_s'|^2 + |E_p'|^2. \tag{11.}$$

$$\theta = arg(E_s') - arg(E_p') \tag{12.}$$

Figure 6:
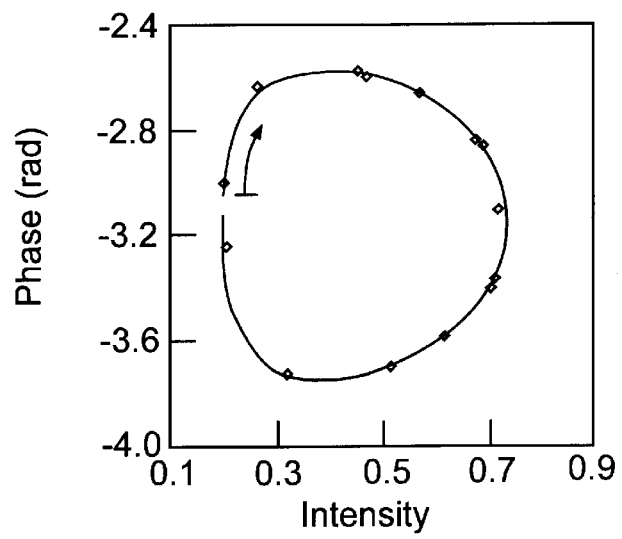
FIG. 6 is a graph showing the comparison of theoretical (solid line) and experimental intensity and phase data; the arrow indicating the direction of increasing flying height, starting from contact and the experimental data were acquired by polarization interferometry of a read-write slider in steady flight at several different locations on the airbearing surface.

FIG. 6 shows a theoretical parametric I-$\theta$ curve of intensity and phase data as it varies with flying height compared with experimental data, and is important to the understanding of the invention. Parametric curves or "trajectories" are often used in analytical geometry to show relationships between variables that depend on a common parameter. A familiar example in electrical enginnering is the Lissajous figure formed on an oscilloscope by two time-dependent signals. FIG. 6 performs a similar function in this context since it shows a number of useful relationships in one concise picture. For example, the approximate circular shape shows that the flying heights are fairly uniformly distributed around this circle, indicating uniform sensitivity. Finally, the plot of experimental data (squares) on same plot provides an indication of the quality of the theoretical fit and provides the basis for simultaneous solution for n, k and flying height, h, in what follows.

For every slider n and k value, there is a corresponding parametric I-$\theta$ curve. The key to determining n and k in situ is the realization that I-$\theta$ curves overlap at only two points, so that three or more I-$\theta$ values at different heights distinguish any given curve from all other possibilities (It is not generally possible to calculate a film thickness as well as the optical constants from a single ellipsometric measurement, hence the need for three or more flying heights for proper n and k calibration. See for example, R. M. A. Azzam and N. M. Bashara, "Ellipsometry and polarized light," (Ellsevier, Amsterdam, 1987), p. 317).

The concept underlying the present inventive methodlogy is to acquire data over a range of unknown heights, and find the n and k for the best possible match of experimental and theoretical I-$\theta$ values using a least-squares analysis. This process is referred to as calibration and involves providing a merit function to assess the quality of the fit between the experimental and theoretical I-$\theta$ values and aids in converging toward final solutions.

In defining a merit function for the least-squares analysis, it is useful to map the theoretical intensity and phase values I,$\theta$ into new variables $\Pi$-$\Omega$ defined by:

$$I' = I + 0.1$$

$$\Omega = -I' \sin(\theta). \tag{13.}$$

$$\Pi = -I' \cos(\theta)$$

The $\Pi$-$\Omega$ variables have a quasi-sinusoidal, quadrature dependence on flying height,h. Measured values of $\Pi$ and $\Omega$, denoted $\Pi^m$ and $\Omega^m$, require a measured intensity $I^m$ that has been properly normalized according to the digitization range of an electronic analog to digital converter (A/D), which is of well-kown design and may reside in compute 99. The normalization strategy involves a background intensity measurement $I_s^{back}$ for the s polarized light, with the slider 30 removed. Then, $$I^m = I_{AD}/I_0, \tag{14.}$$

where $I_{AD}$ is an intensity measured in A/D counts and the normalization constant is:

$$I_0 = I_s^{back}/R_s, \tag{15.}$$

where $R_s$ is the reflectivity of the bare glass. The phase data do not require normalization (Although the phase data do not require normalization, it is important to include the effects of photo-elastic stress in the disk in the theoretical model. See for example U.S. Pat. No. 5,644,562 to P. de Groot entitled "Method and apparatus for measuring and compensating birefringence in rotating disks" (Jul. 1, 1997))

The theoretical $\Pi, \Omega$ require values for n and k. Assume for the moment that reasonable values for the optical constants have been chosen, and that intensity and phase data over a range of N flying heights have been acquired. The data analysis involves a multivariate chi square function (W. H. Press, S. A. Teukolsky, W. T. Vetterling, B. P. Flannery, "Numerical recipes in C" (2nd Ed., Cambridge University Press, 1992) p. 680):

$$\hat{\chi}_i^2(h) = \frac{1}{2}\left\{\left[\frac{\Pi_i^m - \Pi(h)}{\sigma_\Pi}\right]^2 + \left[\frac{\Omega_i^m - \Omega(h)}{\sigma_\Omega}\right]^2\right\}, \tag{16.}$$

where $\sigma_\Pi$ and $\sigma_\Omega$ are the standard deviations for normally-distributed noise in the measured values $\Pi^m$, $\Omega^m$. The calculation of an individual flying height involves a search for the minimum value $\hat{X}^2_{min}$, with the height h as the free parameter. When this process is completed for all flying heights, a global merit function has been defined as:

$$M = \frac{1}{\nu}\sum_{i=0}^{N-1}(\hat{\chi}^2_{min})_i \tag{17.}$$

where $\nu = N-2$ is the number of degrees of freedom. This global merit function M characterizes the goodness of fit between the experimental and theoretical data. The smaller the merit M, the better the fit.

A strategy for simultaneously solving for flying heights and an unknown n and k should now be evident: vary the n and k in search of those values that provide the best global merit M. Solving for n and k involves an iterative search in two dimensions. Typically, two or three iterations for both optical constants will result in a stable convergence to the correct values. A critical aspect of this process is the availability of interference phase information, which makes it possible to draw parametric curves such as the one shown in FIG. 6. It is unlikely, for example, that meaningful n and k can be determined from intensity data alone.

Having described the merit function of the invention, the question of how accurately the polarization interferometer can determine n, k and flying height h will now be dicussed As mentioned above, the iterative process for determining n and k is complete when the merit function M is as small as it can be. The minimum value of M is a measure of the final agreement between experiment and theory, given realistic values for the standard deviations $\sigma_\Pi$ and $\sigma_\Omega$. This minimum value is, therefore, an indication of the quality of the fit, the accuracy of the theoretical model and the uncertainty in the final measurement.

In flying height test equipment, the most significant limitation on precision is unknown systematic measurement errors, as opposed to truly random noise. These errors include the nonlinear response of the optics and electronics, as well as problems associated with dynamic system calibration with real sliders. Although errors of this kind do not strictly obey Gaussian statistics, they are still random in the sense that they are unpredictable and often unrepeatable. For example, the homodyne receiver in the polarization interferometer of FIG. 1 is comprised of two Wollaston prisms, a quarter wave plate and four photodetectors. Error sources such as polarization mixing and other forms of coherent noise introduce uncertainty into the photodetector measurements. The variance of these errors tend to scale with the light intensity. The intensity is itself a function of the flying height of the slider, with the consequence that the measurement errors are also height dependent.

The observations of the previous paragraph translate into an estimate of the normalized variance $\sigma_I^2$ for the total intensity I given by:

$$\sigma_I^2 = I'\sigma^2, \tag{18.}$$

where $\sigma$ is a constant. The same error sources propagate through the phase-measurement algorithms (See, e.g., C. P. Brophy, "Effect of intensity error correlation on the computed phase of phase-shifting interferometry," J. Opt. Soc. Am. A 7 (4), 537–541 (1990).) resulting in a variance for the phase of approximately:

$$\sigma_\theta^2 = \sigma^2/I'. \tag{19.}$$

The phase and intensity variances transform to the $\Pi$-$\Omega$ parameters as follows:

$$\sigma_\Omega^2 = \sigma_\theta^2 \Pi^2 + (\sigma_I/I')^2 \Omega^2$$

$$\sigma_\Pi^2 = \sigma_\theta^2 \Omega^2 + (\sigma_I/I')^2 \Pi^2 \tag{20.}$$

Noting that the sum of the squares of $\Pi$ and $\Omega$ is $I'^2$, it can now be seen that $$\sigma_\Omega^2 = \sigma_\Pi^2 = I'\sigma^2. \tag{21.}$$

It is emphasized that this error analysis is meant to be physically reasonable, not rigorous. However, Eq. (21) does lead to a very convenient conclusion: The $\Pi$ and $\Omega$ variables in the least-squares calculation have equal weight for all flying heights. Therefore, only one constant value $\sigma$ is needed to properly normalize the chi-square function in Eq. (16).

Using Eq. (21), the merit function in Eq.(17) simplifies to:

$$M = \frac{1}{\nu\sigma^2}\sum_{i=0}^{N-1}(\chi^2_{min})_i \tag{22.}$$

and $$\chi_i^2(h) = \frac{[\Pi_i^m - \Pi(h)]^2[\Omega_i^m - \Omega(h)]^2}{2I'(h)}. \tag{23.}$$

Figure 7:
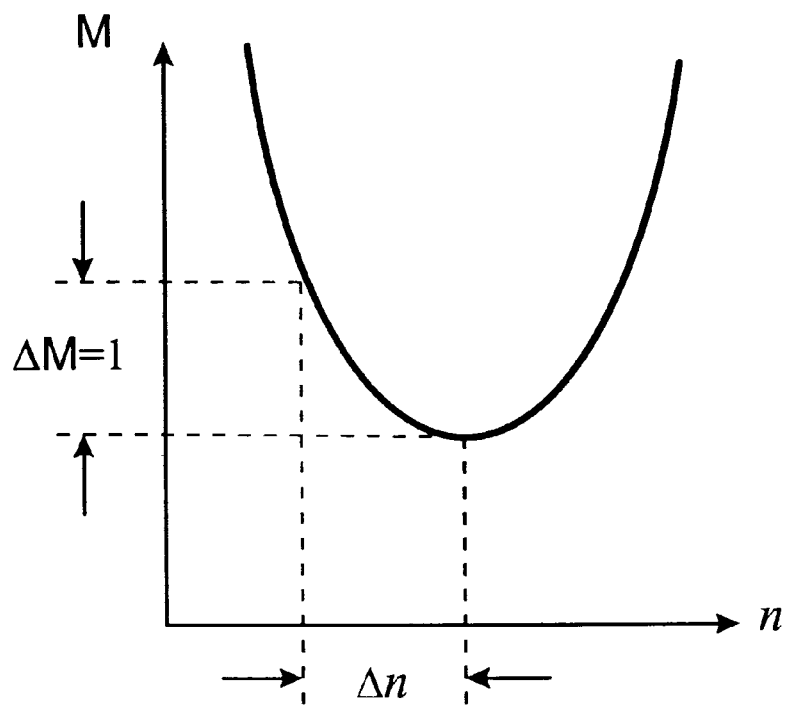
FIG. 7 is a graph illustrating the calculation of the uncertainty Δn using the sensitivity of the merit function M to variations in n.

With this normalized merit function M, the uncertainties $\Delta n$ and $\Delta k$ and their impact on the overall system accuracy can be estimated. FIG. 7 illustrates the procedure for determining $\Delta n$. After determining the optical constants n and k that minimize M, the change $\Delta n$ that changes M by one is found, assuming that freedom in the k value to re-minimize M is allowed. The change $\Delta n$ is the one-sigma uncertainty in n. Thus, if the merit M is only weakly dependent upon the index n, or if the σ is very large, the resultant uncertainty will be higher.

The procedures for calculating Δn and Δk require a good estimate of the measurement uncertainty σ. Analysis of known error sources, such as nonlinear response of the homodyne receiver, fluctuations in laser power and uncompensated photo-elastic stress in the glass disk provide an estimate of σ=0.005. This is equivalent to a typical uncertainty of 20 mrad P-V for phase and 2% P-V for intensity. Using this value of σ, a numerical analysis for a slider 30 under realistic conditions yields an uncertainty Δn=Δk=0.04. This result compares favorably with the uncertainty in standard ellipsometry for $Al_2O_3$-TiC materials.

How the uncertainties in the n and k calibration couple into uncertainty in flying height, h, will now be discussed. To answer this question, the n value is first changed by Δn and the height change $\Delta h_n$, caused by this change in n is calculated. The same is then done for k to get an uncertainty $\Delta h_k$. The square root of the average variances is the net rms uncertainty in flying height:

$$\Delta h = \sqrt{\frac{1}{2}(\Delta h_n^2 + \Delta h_k^2)}. \quad (24.)$$

This can be done for every measurement point. FIG. 5 shows the results of a numerical analysis using this equation to determine the final flying height uncertainty as a function of flying height. This result confirms that the polarization interferometry of the invention provides satisfactory results over the entire height range, while simultaneously providing the appropriate values of n and k for the test slider 30. The performance is particularly good at low flying heights, where correct values of n and k have the greatest influence on relative accuracy.

Figure 9:
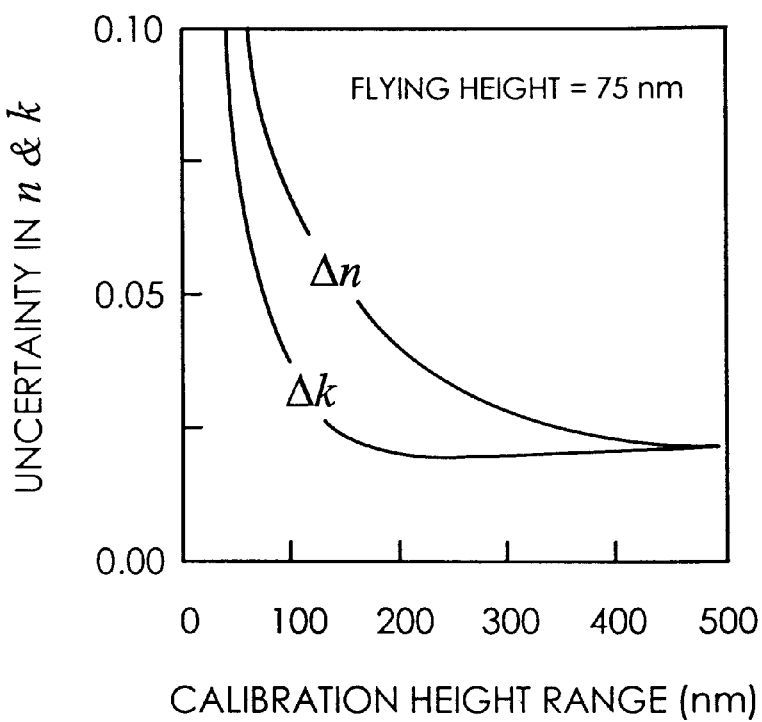
FIG. 9 is a graph illustrating the uncertainty in n and k as a function of the calibration height range; the calculation assuming phase and intensity measurements over a range of evenly-spaced flying heights, with the lowest flying height at 75 nm, and the calibration height range is the difference between the highest and lowest flying height.
Figure 10:
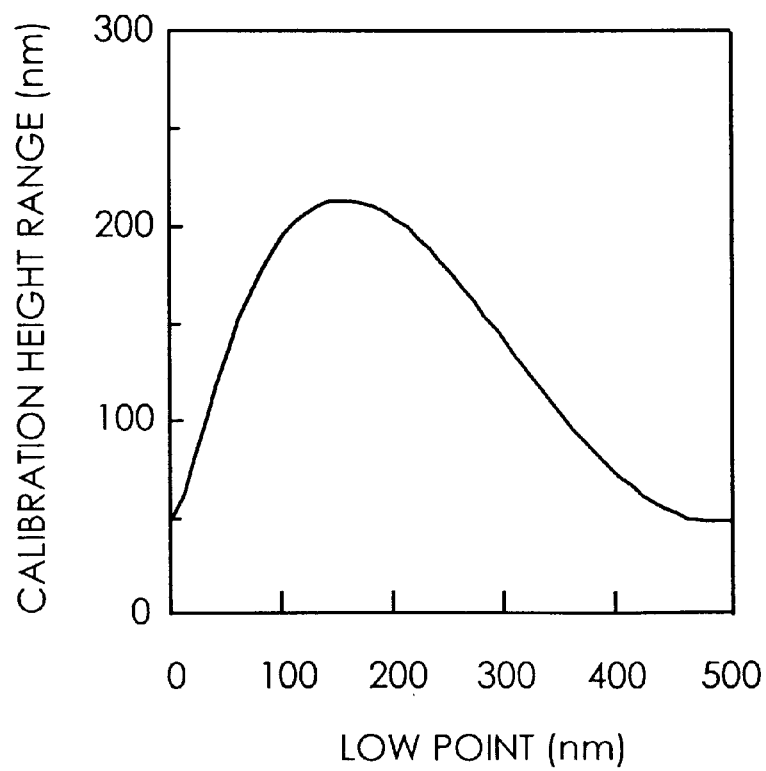
FIG. 10 is a graph illustrating the minimum calibration range to maintain an rms uncertainty for n and k below 0.05.

Having described the fundamental procedures for simoultaneous acquistion of n, k, and h, calibration procedures will now be addressed. Reliable n and k calibration requires several intensity and phase measurements over a range of flying heights. As FIG. 9 shows, the larger the height range for calibration, the more accurate and repeatable the n and k. The minimum required calibration height range H for a given uncertainty in n and k varies considerably with the lowest height within the range. The curve in FIG. 10 shows the range H to maintain an uncertainty in n and k below 0.05.

A well-known calibration technique for flying height testers involves removing or unloading the slider 30 from the disk 20 and loading it back again, to generate a time-dependent range of flying heights. A high-speed sensor (250 kHz) is required to follow the highly dynamic motion of the slider 30. This procedure, sometimes called a retract calibration, is common in traditional flying height testers that use intensity data alone. With polarization interferometry, retract calibration is most useful for verifying the n and k at specific points on the ABS. Examples of phase and intensity data for a retract calibration appear in, for example, P. de Groot, L. Deck, J. Soobitsky and J. Biegen, "Optical flying-height testing of magnetic read-write heads" Proc. SPIE 2782, Lasers, Optics, and Vision for Productivity in Manufacturing I, 47–57 (1996). If high-quality retract calibration is available over a large height range, it is even possible to solve directly for n and k using analytical formulas in place of a least-squares analysis.

Although a mechanical retract of the slider is still the most common technique for calibrating flying height testers, the dynamical properties of several new slider designs are not consistent with this practice. For these modern sliders, the quality of the retract data is insufficient for accurate calibration. Further, repeated loading and unloading of the slider assembly can damage the sample.

Figure 11:
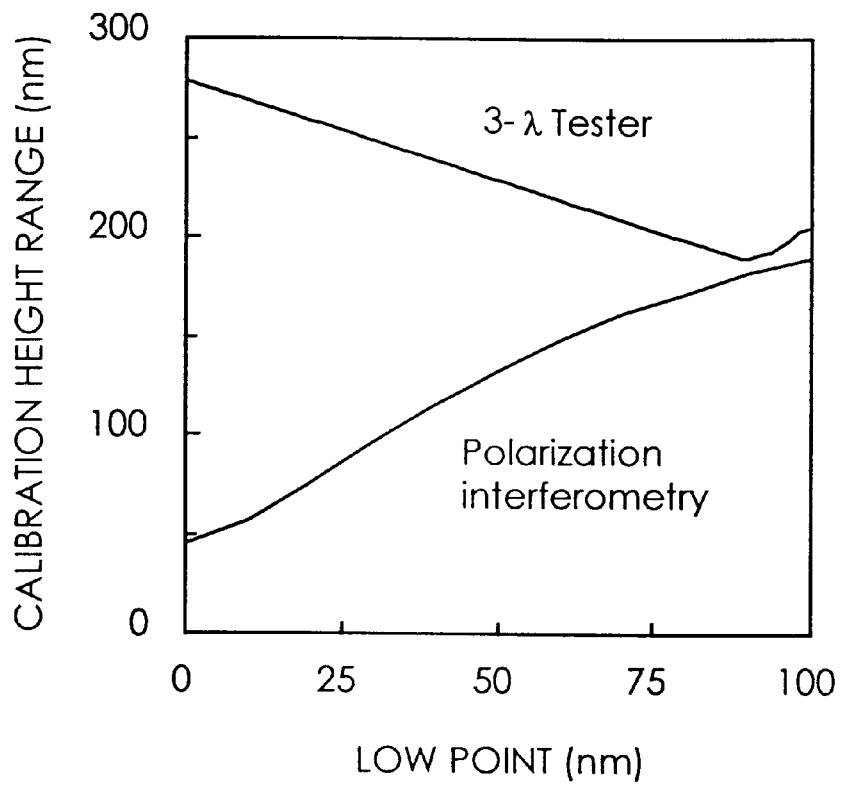
FIG. 11 is a graph showing a comparison of the minimum calibration range for a three-wavelength (3-λ) intensity tester (upper curve) with that of a polarization interferometer (lower curve), the 3-λ curve being the minimum range needed to normalize experimental intensity data at 436, 548 and 580 nm wavelengths. As flying heights decrease, the graph shows that it is more and more attractive to use polarization interferometry because of its relative ease of calibration.

Polarization interferometry provides an attractive alternative to the traditional retract calibration. As is evident from FIG. 10, the required range H for calibration is usually small enough that it is practical to calibrate by scanning to multiple locations on the slider ABS. The majority of sliders in common use today are pitched slightly from trailing to leading edge in normal flight, typically providing greater than 50 nm of height variation. This is an insufficient range for calibration of traditional three-wavelength intensity testers, which require min-max information to properly scale the experimental data. However, as FIG. 11 shows, calibration by ABS scanning becomes progressively easier for polarization interferometry as flying heights decrease.

Figure 12:
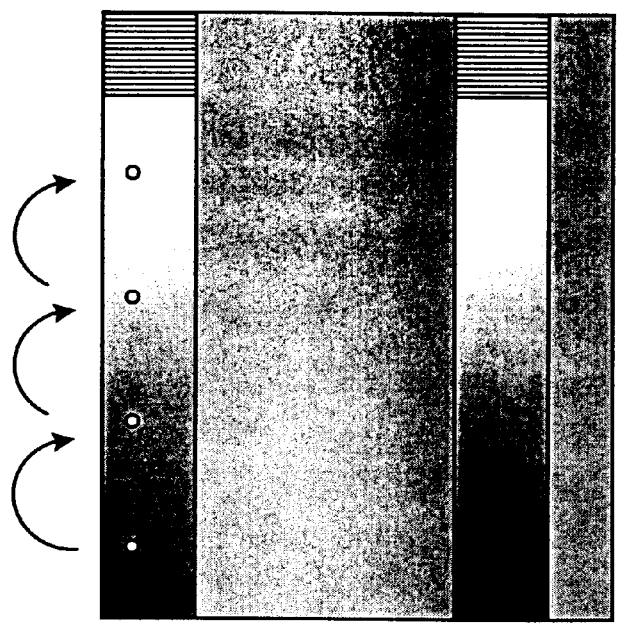
FIG. 12 is a diagrammatic view showing data acquisition by ABS scanning with a single point measurement beam; the single-point measurement beam moving from point to point on the ABS, acquiring data at different heights for the n and k calibration.
Figure 13:
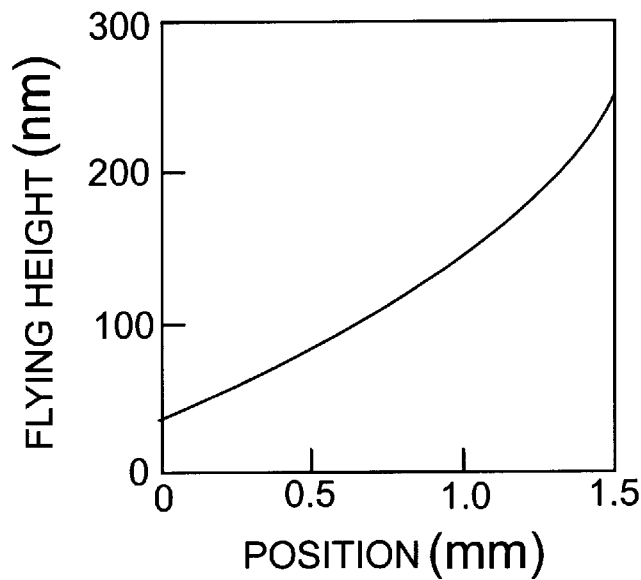
FIG. 13 is a graph showing the cross section of a cylindrical surface fit of height data obtained by scanning the slider ABS as shown in FIG. 12; the obvious curvature referred to as the ABS crown which is generated by polishing the slider on a spherical lap where the surface fit permits extrapolation to the read-write element of the slider.

The simplest form of ABS scanning is a sequence of measurements at discrete positions, as shown in FIG. 12. With appropriate well-known encoding hardware resident on board computer 99 to record the exact measurement locations, the data acquisition takes the form of a rapid, continuous scan of the ABS. With continuous scanning, it is possible to acquire data for hundreds of ABS locations in a few seconds. To achieve this, a mechanical arm 31 (See FIG. 1) may be selectively actuated by a precision loading mechanism 32 under the control of computer 99 to precisely place a slider 30 with respect to the surface of disk 20. The resulting high-density data provides detailed, noise-resistant information regarding the ABS profile. A second-order surface fit to experimental data is illustrated in FIG. 13, showing the typical curvature or crown of the ABS. The ability to calibrate without a mechanical retract of the slider 30 is a significant and fundamental advantage of polarization interferometry.

A reasonable alternative approach to acquiring large amounts of data is to employ one or more CCD cameras of the type described in connection with FIGS. 4 and 5. The advantage of such a system is that multiple ABS locations are accessed simultaneously, without the need for mechanical scanning.

The n and k calibration principle of the invention have been verified in both in laboratory tests with well-characterized samples and in final performance tests with $Al_2O_3$-TiC read-write sliders. Laboratory tests have been extensive, and verify both the repeatability and absolute accuracy of polarization interferometry. In these tests, the sensor is arranged so as to laterally scan across a gap standard 150 (See FIG. 14) comprised of a silicon-carbide flat (SiC) 154 and a slightly-domed glass window 152. The glass is placed in contact with the highly-polished SiC, and the 20-m convex radius of the glass provides a stable range of gaps for calibration. FIG. 15 shows a typical scan of the gap standard using polarization interferometry. The extended contact region, known historically has Newton's black spot, is an excellent means of verifying correction for zero-spacing error.

Figure 8:
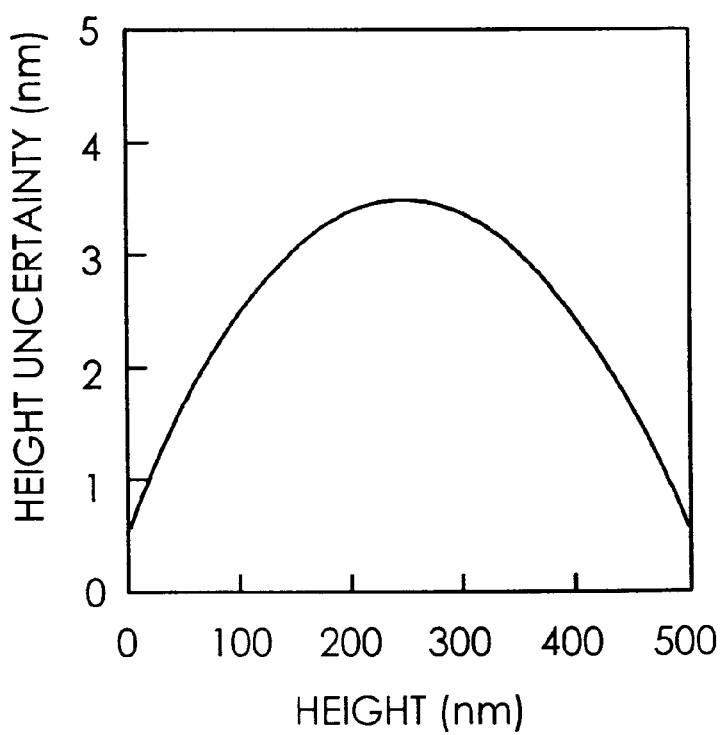
FIG. 8 is a graph showing the theoretical estimate of flying height errors in polarization interferometry, these data corresponding to an rms uncertainty in both n and k of 0.04.

Because the optical sensor is preferably part of a manufactured instrument product, it is possible to perform a very strenuous laboratory test of the accuracy and repeatability of the present n and k technique. The same test sample with sixteen different sensors taken from a production line, over a period of several months. The results in Table 3 below show standard deviations for n and k that are both very close to the prediction of 0.04 appearing previously. This is a test not only of the measurement uncertainty, but of the reproducibility of the manufacturing process, as well. The averaged values of n and k also correlate to within 0.05 to conventional null ellipsometry at the same 670-nm wavelength. The average measured contact height is 1.3 nm with a standard deviation of 0.65 nm, in excellent agreement with FIG. 8.

TABLE 3

Experimental determination of the optical constants of SiC by polarization interferometry, using 16 different sensors over a period of several months.

| Trial | n | k |
|---|---|---|
| 1 | 2.61 | 0.06 |
| 2 | 2.53 | 0.04 |
| 3 | 2.49 | 0.05 |
| 4 | 2.66 | 0.06 |
| 5 | 2.56 | 0.01 |
| 6 | 2.62 | 0.03 |
| 7 | 2.57 | 0.03 |
| 8 | 2.61 | 0.06 |
| 9 | 2.60 | 0.04 |
| 10 | 2.54 | 0.05 |
| 11 | 2.52 | 0.02 |
| 12 | 2.48 | 0.03 |
| 13 | 2.49 | 0.05 |
| 14 | 2.63 | 0.12 |
| 15 | 2.66 | 0.06 |
| 16 | 2.66 | 0.07 |
| Standard deviation: | 0.06 | 0.03 |
| Average values: | 2.58 | 0.05 |
| Independent Ellipsometer: | 2.63 | 0.09 |

The n and k calibration is also highly repeatable in dynamic testing with actual sliders. Table 4 shows the measured n and k for the two rails of an $Al_2O_3$-TiC catamaran slider using ABS scanning. The disk spin speed for was 5,000 rpm and the pitch height was 230 nm. After each trial, the slider was unloaded from the disk, reloaded and repositioned for the next trial. The rms repeatability for this test, which uses the same sensor and the same part, is better than 0.002 for both n and k.

TABLE 4

Dynamic repeatability of calibration for an $Al_2O_3$—TiC slider using ABS scanning.

| Inner rail | | Outer rail | |
|---|---|---|---|
| n | k | n | k |
| 2.2273 | 0.6000 | 2.2300 | 0.6076 |
| 2.2273 | 0.6000 | 2.2317 | 0.6048 |
| 2.2280 | 0.6019 | 2.2327 | 0.6059 |
| 2.2292 | 0.6012 | 2.2311 | 0.6049 |
| 2.2282 | 0.5999 | 2.2308 | 0.6057 |
| 2.2279 | 0.5999 | 2.2299 | 0.6041 |
| 2.2266 | 0.5979 | 2.2285 | 0.6006 |
| 2.2262 | 0.5964 | 2.2295 | 0.6016 |

Extensive testing indicates that a realistic expectation for correlation between polarization interferometry and independent ellipsometry of $Al_2O_3$-TiC is 0.1 for both n and k. The limits to correlation when using $Al_2O_3$-TiC materials are rooted in the n and k approximation, which as noted above, does not correctly predict the intensity reflectivity. Because the flying height tester of the invention calibrates for the apparent intensity reflectivity directly, the effective n and k for polarization interferometry can differ from ellipsometric measurements.

Figure 14:
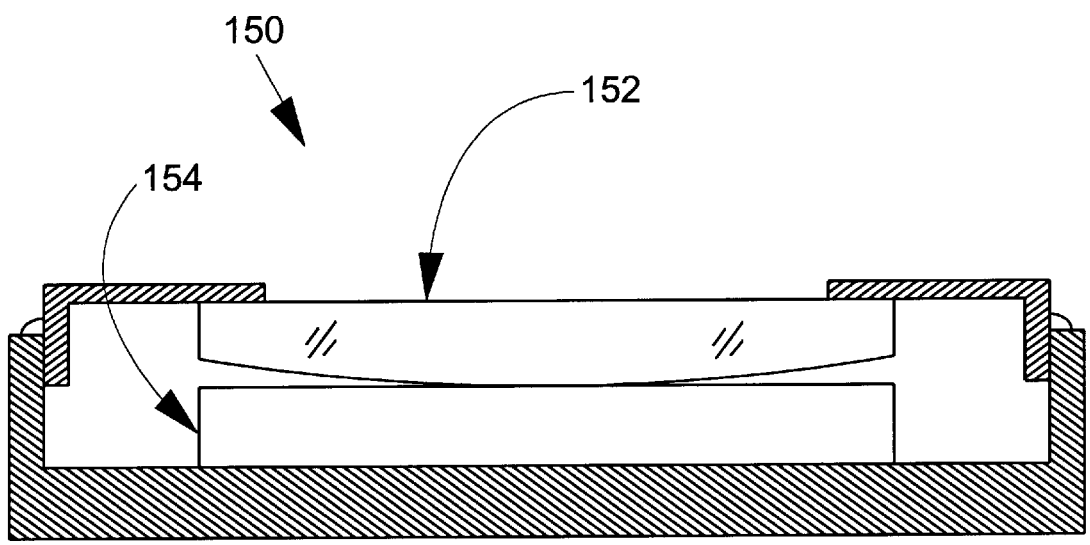
FIG. 14 is a diagrammtic view showing a gap standard for verifying the accuracy of polarization interferomctry; the glass having a 20-m radius of curvature, and when placed in contact with the flat SiC substrate, providing a well-controlled range of gaps. The contact region is a small circular area of low reflectivity, known historically as Newton's black spot.
Figure 15:
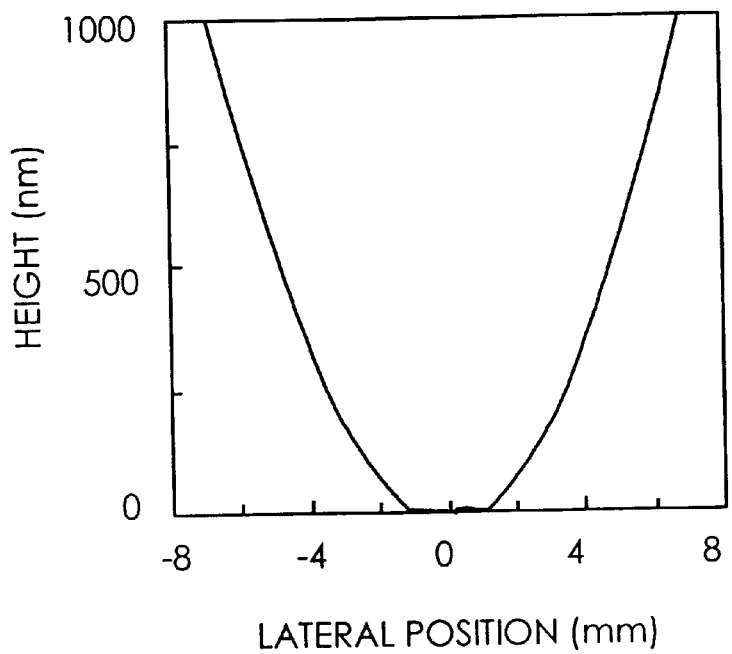
FIG. 15 is a graph of polarization interferomctry data for the gap standard shown in FIG. 14 using a SiC substrate where the contact region between −1 and +1 mm has an average measured gap of 0.5 nm and the increasing heights to either side of the contact region are caused by the 20-m radius of curvature of the glass.
Figure 16:
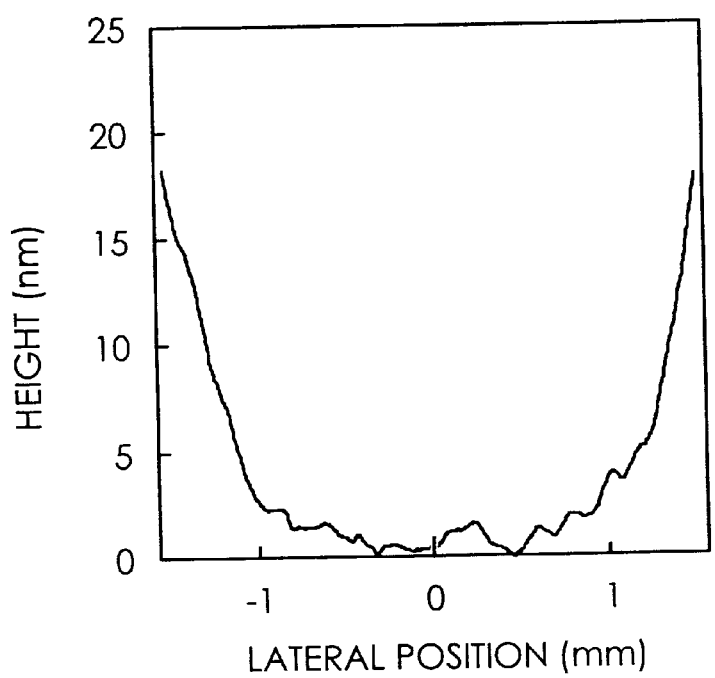
FIG. 16 is a graph showing the contact region of the gap standard shown in FIG. 14 for a flat substrate made of carbon-coated $Al_2O_3$-TiC and, for this sample of common slider material, the in situ n and k analysis reduces the zero-spacing error to less than 1 nm.

A more direct means of verifying that the sensor is properly calibrated for material properties is to place a bulk sample of $Al_2O_3$-TiC into the gap standard shown in FIG. 14. The curve in FIG. 16 represents typical results for the contact region between the glass and an $Al_2O_3$-TiC sample coated with a 2-nm $SiO_2$ adhesion layer and 6 nm of diamond-like carbon. The 1-nm average surface height within the contact region indicates that the n and k calibration values of 2.13 and 0.30, respectively, are properly compensating for ZSE. A greater variation in average contact height from sample to sample with $Al_2O_3$-TiC has been observed compared with the current results with SiC. This variation is attributed in part to the 2-nm rms surface roughness of this material, which results in approximately the same rms range of contact heights.

In summary, it has been shown that it is possible and practical to measure the optical constants of every slider during optical flying height testing, thus obviating the need for a separate metrology step with an ellipsometer. To achieve this goal, the inventive instrument measures the polarization-dependent variation in the reflectivity of the slider-glass interface, using light incident at an oblique angle. The same instrument then performs the flying-height measurement and simultaneously determines the effective n and k. This capability increases confidence in the final result, especially at low flying heights.

The n and k calibration consists of a least-squares fit of theoretical intensity and phase curves to experimental data acquired over a range of flying heights. The data for calibration may be acquired either by retracting the slider or by scanning the slider ABS. The ability to calibrate by ABS scanning is particularly attractive with modern negative-pressure sliders.

Assuming typical and reasonable levels of uncertainty for phase and intensity data, we predict a typical rms uncertainty for n and k of 0.04. Experimental work confirms this numerical value (Table 3). This uncertainty in n and k calibration propagates to a typical 2-nm uncertainty in flying height, progressing to less than 1 nm near contact. Experiments with a gap standard confirm this prediction.

Figure 17:
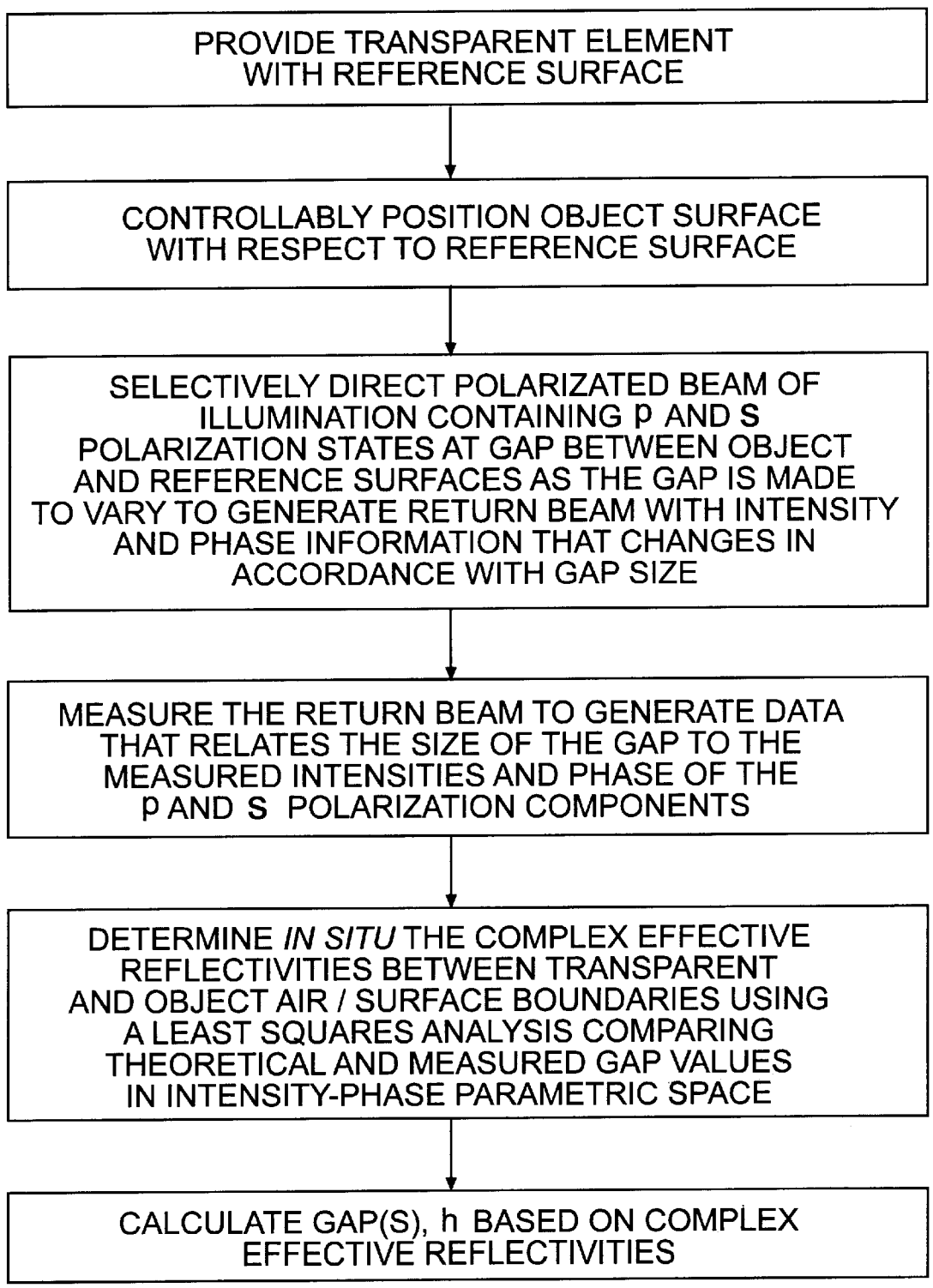
FIG. 17 is a high level flow chart illustrating the methodology of the invention.

FIG. 17 shows a high level flow chart for the method of the invention including a broad statement of the algorithms implemented to simultaneously measure gap and complex index or reflectivities in situ. Those skilled in the art will recognize that the algorithmic elements of the chart may be implemented via coding of a suitable software program to be run on computer 99 or its equivalent in the form of a dedicated microprocessor or the like.

Those skilled in the art will appreciate that several alternative embodiments of the present invention are possible without departing from the spirit of the invention. For example, an alternative embodiment of the invention for flying-height testing involves a substantially transparent surrogate slider flying on a real disk coated with magnetic media. In another embodiment, the transparent element comprises a plurality of surfaces to measure discontinuous features on an object or objects under test. In still another embodiment, the transparent element serves as a reference for profiling the object surface, which may be stationary or in motion in close proximity to the transparent element.

All of the embodiments benefit from the advantages of the disclosed invention, which include the ability to measures gaps with high sensitivity over a wide range using a single-wavelength source, the ability to measure very small gaps down to actual contact between the surfaces, the ability to measure and compensate for the complex index of refraction of the test object, and the insensitivity of the inventive apparatus to air currents and small mechanical distortions.

What is claimed is:

1. Apparatus for analyzing a gap separating two surfaces, said apparatus comprising:

a transparent element having a reference surface;

mounting means for facilitating the relative positioning of an object surface with respect to said reference surface so that the size of the gap between said reference surface and said object surface varies in a characteristic way as a function of the relative position between the two;

means for selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transparent element at an oblique angle and reflected from said reference surface and said object surface as a combined return beam that emerges from said transparent element to travel along a predetermined measurement path disposed along a predetermined angle with respect to said oblique angle of incidence, said combined return beam containing p- and s-polarization components whose intensities and relative phase vary in accordance with the size of the gap between said reference surface and said object surface at the spot of measurement;

means for measuring said combined return beam to determine the intensities and relative phase of its p- and s-polarization components and generate data that relates the size of the gap with the values of the measured intensities and relative phase of said p- and s-polarization components; and means for determining the effective reflectivities between said object surface and air and said transparent element surface and air and the size of the gap between said reference and object surfaces for at least one predetermined object position and measurement spot on said object surface, where said reflectivities are given by:

$$z_{s,p}(\beta) = \frac{r_{s,p} + r''_{s,p}\exp(i\beta)}{1 + r_{s,p}r''_{s,p}\exp(i\beta)},$$

where $\beta$ is given by:

$$\beta = 2kh\cos(\phi),$$

and the subscripts refer to the s and p polarization states, h is the gap, $k=2\pi/\lambda$, $\phi$ is the angle of incidence, the reflectivities $r_{s,p}$ are for the glass-air boundary of said transparent element, while the reflectivities $r''_{s,p}$ refer to the air-object surface boundary.

2. The apparatus of claim 1 wherein said reflectivities are related by:

$$r''_{s,p} = (1-\mu)r'_{s,p}e^{i\delta},$$

where $r'_{s,p}$ is the reflectivity calculated from Fresnel's formulas and the parameters $\mu$ and $\delta$ are real constants.

3. The apparatus of claim 2 wherein said real constant $\mu$ parameter is set to a compromise between a measured value for heterogeneous $Al_2O_3$-TiC and a theoretical value for true homogeneous materials.

4. The apparatus of claim 3 wherein said real constant $\mu$ parameter is set to substantially 0.05.

5. The apparatus of claim 1 wherein said data comprises at least three data points corresponding to three different gaps.

6. The apparatus of claim 5 wherein said data is organized in I-$\theta$ parametric space with the common variable being said gap wherein I is the intensity of the combined return beam and $\theta$ is the phase of the combined return beam.

7. The apparatus of claim 6 wherein said data is acquired over a range of unknown gaps, and the best possible match between the complex index of refraction components n (real) and k (imaginary) experimental and theoretical I-$\theta$ values is determined using a least-squares analysis.

8. The apparatus of claim 1 wherein said mounting means, said means for selectively directing said polarized beam, and said means for measuring said combined return beam are configured and arranged with respect to one another to generate data for more than one point over said gap while said reference and object surfaces are in any of their relative positions with respect to one another.

9. The apparatus of claim 1 wherein said mounting means, said means for selectively directing said polarized beam, and said means for measuring said combined return beam are configured and arranged with respect to one another to generate data from a single location with respect to said gap as the relative position between said reference and object surfaces varies.

10. The apparatus of claim 9 wherein said mounting means, said means for selectively directing said polarized beam, and said means for measuring said combined return beam are further configured and arranged with respect to one another to generate data from more than one location with respect to said gap as the relative position between said reference and object surfaces varies.

11. The apparatus of claim 1 wherein said transparent element comprises a surrogate glass disk mounted for rotation about a central axis.

12. The apparatus of claim 11 wherein object surface comprises part of a magnetic head slider.

13. The apparatus of claim 12 wherein said surrogate glass disk has to spaced apart substantially parallel planar surfaces and one of said planar surfaces is said reference surface.

14. The apparatus of claim 13 wherein said planar reference surface of said surrogate and the geometry of said magnetic head slider surface are such that said gap between the two varies in two dimensions.

15. The apparatus of claim 1 further including means for moving said transparent element with respect to said object surface at least while said reference surface and said object surface are in one position relative to one another.

16. The apparatus of claim 1 wherein said means for measuring said combined return beam comprises photodetector means and polarizing means.

17. The apparatus of claim 16 wherein said photodetector means comprises a least one area array for measuring more than one point under a spot illuminated by said polarizing beam.

18. The apparatus of claim 16 wherein said photodetector means comprises intensity photodetector means and phase photodetector means.

19. A method for analyzing a gap separating two surfaces, said method comprising the steps of:

providing a transparent element having a reference surface;

facilitating the relative positioning of an object surface with respect to said reference surface so that the size of the gap between said reference surface and said object surface varies in a characteristic way as a function of the relative position between the two;

selectively directing at least one polarized beam of illumination containing p- and s-polarization states at said transparent element along a common path at at least one location corresponding to a measurement spot over said gap while said object and reference surfaces are in at least one relative position with respect to one another, said polarized beam of illumination being incident to said transparent element at an oblique angle and reflected from said reference surface and said object surface as a combined return beam that emerges from said transparent element to travel along a predetermined measurement path disposed along a predetermined angle with respect to said oblique angle of incidence, said combined return beam containing p- and s-polarization components whose intensities and relative phase vary in accordance with the size of the gap between said reference surface and said object surface at the spot of measurement;

measuring said combined return beam to determine the intensities and relative phase of its p- and s-polarization components and generate data that relates the size of the gap with the values of the measured intensities and relative phase of said p- and s-polarization components; and determining the effective reflectivities between said object surface and air and said transparent element surface and air and the size of the gap between said reference and object surfaces for at least one predetermined object position and measurement spot on said object surface, where said reflectivities are given by:

$$z_{s,p}(\beta) = \frac{r_{s,p} + r''_{s,p}\exp(i\beta)}{1 + r_{s,p}r''_{s,p}\exp(i\beta)},$$

where $\beta$ is given by:

$$\beta = 2kh\cos(\theta),$$

and the subscripts refer to the s and p polarization states, h is the gap, $k=2\pi/\lambda$, $\theta$ is the angle of incidence, the reflectivities $r_{s,p}$ are for the glass-air boundary of said transparent element, while the reflectivities $r''_{s,p}$ refer to the air-object surface boundary.

20. The method of claim 19 wherein said reflectivities are related by:

$$r''_{s,p} = (1-\mu)r'_{s,p}e^{i\delta},$$

where $r'_{s,p}$ is the reflectivity calculated from Fresnel's formulas and the parameter $\mu$ and $\delta$ are real constants.

21. The method of claim 20 wherein said real constant $\mu$ parameter is a compromise between a measured value for heterogeneous $Al_2O_3$-TiC and a theoretical value for true homogeneous materials.

22. The method of claim 21 wherein said real constant $\mu$ parameter is set to substantially 0.05.

23. The method of claim 19 wherein said data comprises at least three data points corresponding to three different gaps.

24. The method of claim 23 wherein said data is organized in I-$\theta$ parametric space with the common variable being the gap wherein I is the intensity of the combined return beam and $\theta$ is the phase of the combined return beam.

25. The method of claim 24 wherein said data is acquired over a range of unknown gaps and the best possible match between the complex index of refraction components n (real) and k (imaginary) experimental and theoretical I-$\theta$ values is determined using a least-squares analysis.

26. The method of claim 19 wherein said polarized beam of illumination and said reference and object surfaces are manipulated to generate data for more than one point over said gap while said reference and object surfaces are in any of their relative positions with respect to one another.

27. The method of claim 19 wherein said polarized beam of illumination and said reference and object surfaces are manipulated to generate data from a single point over said gap as the relative position between said reference and object surfaces is made to vary.

28. The method of claim 19 wherein said polarized beam of illumination and said reference and object surfaces are manipulated to generate data from more than one location with respect to said as the relative position between said reference and object surfaces is made to vary.

29. The method of claim 19 wherein said transparent element comprises a surrogate glass disk mounted for rotation about a central axis.

30. The method of claim 29 wherein the object surface comprises part of a magnetic head slider.

31. The method of claim 29 wherein said surrogate glass disk has two spaced apart substantially parallel planar surfaces and one of said planar surfaces is said reference surface.

32. The method of claim 31 wherein said planar reference surface of said surrogate disk and the geometry of said magnetic head slider surface are such that said gap between the two varies in two dimensions.

33. The method of claim 19 further including the step of moving said transparent element with respect to said object surface at least while said reference surface and said object surface are in one position relative to one another.

34. The method of claim 19 wherein said step of measuring said combined return beam comprises using a photodetector means and polarizing means.

35. The method of claim 34 wherein said photodetector means comprises a least one area array for measuring more than one point under a spot illuminated by said polarizing beam.

36. The method of claim 34 wherein said photodetector means comprises intensity photodetector means and phase photodetector means.

* * * * *